(12) United States Patent
Schowtka et al.

(10) Patent No.: US 7,339,598 B2
(45) Date of Patent: Mar. 4, 2008

(54) SYSTEM AND METHOD FOR AUTOMATED PRODUCT DESIGN

(75) Inventors: Alexander K. Schowtka, Weston, MA (US); Eliza H. Royal, Lincoln, MA (US); Daniel R. Malone, Arlington, MA (US); Eric Walker, Weymouth, MA (US); Anatoliy V. Tsykora, Waltham, MA (US)

(73) Assignee: Vistaprint Technologies Limited, Hamilton (BM)

( * ) Notice: Subject to any disclaimer, the term of this patent is extended or adjusted under 35 U.S.C. 154(b) by 689 days.

(21) Appl. No.: 10/617,903

(22) Filed: Jul. 11, 2003

(65) Prior Publication Data

US 2005/0010868 A1    Jan. 13, 2005

(51) Int. Cl.
*G09G 5/00* (2006.01)
(52) U.S. Cl. ............ 345/619; 715/517; 715/530; 715/733
(58) Field of Classification Search ............ None
See application file for complete search history.

(56) References Cited

U.S. PATENT DOCUMENTS

| | | | | |
|---|---|---|---|---|
| 5,557,728 A | * | 9/1996 | Garrett et al. ............ 715/801 |
| 5,748,484 A | * | 5/1998 | Cannon et al. ............ 700/233 |
| 5,930,811 A | * | 7/1999 | Nojima et al. ............ 715/517 |
| 6,018,774 A | | 1/2000 | Mayle et al. |
| 6,028,603 A | * | 2/2000 | Wang et al. ............ 715/776 |
| 6,167,382 A | * | 12/2000 | Sparks et al. ............ 705/26 |
| 6,587,596 B1 | | 7/2003 | Haeberli |
| 2001/0048447 A1 | * | 12/2001 | Jogo ............ 345/620 |
| 2002/0025085 A1 | * | 2/2002 | Gustafson et al. ......... 382/311 |
| 2002/0030634 A1 | | 3/2002 | Noda et al. |
| 2002/0191861 A1 | * | 12/2002 | Cheatle ............ 382/282 |
| 2003/0055871 A1 | * | 3/2003 | Roses ............ 709/203 |
| 2004/0117735 A1 | | 6/2004 | Breen |
| 2004/0257380 A1 | * | 12/2004 | Herbert et al. ............ 345/619 |
| 2005/0144256 A1 | | 6/2005 | Blumberg |

* cited by examiner

*Primary Examiner*—Kee M. Tung
*Assistant Examiner*—Michelle K Lay
(74) *Attorney, Agent, or Firm*—Robert L. Dulaney (57) ABSTRACT

Automated electronic document design systems and methods for combining identified images and layouts into electronic product templates for displaying to a user. A plurality of images and a plurality of layouts are retained. Stored images are identified based on keyword input by the user. Stored layouts contain one or more image containers and are identified based on product type and number of layout images input by the user. Images and layout image containers are designed to use pre-determined standard sizes to facilitate modularity and the ready combination of images and layouts.

25 Claims, 8 Drawing Sheets

SYSTEM AND METHOD FOR AUTOMATED PRODUCT DESIGN

FIELD OF THE INVENTION

The present invention relates to computer-implemented automated product design.

BACKGROUND OF THE INVENTION

Many individuals, businesses and organizations occasionally have a need for custom printed materials, such as a birth announcement, a party invitation, a brochure describing a product or service, a promotional postcard notification about an upcoming sale, or any number of other things. Simply placing plain text on a plain background is usually not satisfactory. Most people prefer that their information be presented in a pleasing layout combined with one or more attractive images that have some thematic relevance to the purpose of the document. Few individuals, however, have the time, desire and expertise to experiment with possible layout/image arrangements or to search for, upload, resize, and position desirable images. Typically, only larger enterprises with regular and substantial printing requirements are able to employ a specialist with graphic design skills.

One option for individuals and smaller businesses desiring well-designed, professional appearing documents with attractive layouts and images has been the local print shop, where they describe their requirements and look through representative samples. Multiple visits may be required to review proofs, make corrections or pick up the final printed product. As an alternative, various specialized software products are available that present a customer with a set of pre-designed document templates in which the user can insert the user's personal information to allow the user to prepare personalized greeting cards, invitations or the like. These software products must typically be purchased and installed permanently on the user's computer and require at least some familiarization and training to be used properly and efficiently. Further, the printing devices connected to the typical personal computer used by an individual or small business are often not suitable for, or capable of, producing quantities of quality full color materials.

To provide an alternative to the above approaches, printing service providers, taking advantage of the capabilities of the Web and modern Web browsers, provide document design services for user's desiring to create customized documents from any computer with Web access at whatever time and place is convenient to the user. These service providers typically provide their customers with the ability to access the service provider's web site, view product templates and enter information to create a customized markup language document. After the document has been designed by the user, Web-based service providers also typically allow the user to place an order for the production and delivery to the user's home or business of quantities of high quality, printed documents of the type that the user is not capable of producing with the printer systems typically connected to most personal computer systems.

One network-based product design system is disclosed in co-pending and co-owned U.S. application Ser. No. 09/557,571 entitled "Managing Print Jobs", which is hereby incorporated by reference. The system discloses a downloadable editing tool that allows a customer to create and edit WYSIWYG ("what you see is what you get") markup language documents in the customer's browser. The system makes a number of pre-designed product templates available for customer viewing, downloading, and customizing. The customer can upload the electronic document to a server and place an order for production of the printed products.

Pre-designed document templates that can be individually selected and downloaded to assist the user in creating a document in the user's browser are known in the art. Typically, a number of different templates with various images and design features are provided to offer the user a range of choices. To help the user to locate specific types of templates of interest to the user, template offerings are sometimes divided into predefined search categories (e.g., Type of Industry) and, within a category, into predefined specific subcategories (e.g., Construction, Education, Insurance, Real Estate). After selecting a category and subcategory, the user is presented with thumbnail images of available templates. If the user selects one, the selected template is downloaded to the user's computer system along with downloaded software tools that can be employed by the user to create a personalized electronic document.

Each template is typically individually designed. The template development process includes the definition of all details of the template, such as defining the position of all image and text areas in the template, selecting, sizing and positioning images in the template, defining colors to be used for template elements having a color attribute, and so forth. The template designer will adjust the elements until the designer is satisfied with the overall appearance of the template. This hand crafting of template design is time consuming and, therefore, a significant expense for the service provider. To continue to expand its template offerings and to present potential customers with as many pleasing and varied options as possible, the service provider must typically employ a staff of professional designers. Further, the service provider may have thousands of images that the service provider would like to provide for use, and that customers would like to use, but that cannot be quickly made available and exploited because of the time involved in individually designing templates on a one-by-one basis.

There is, therefore, a need for a novel and flexible template generation system that allows a service provider to greatly increase the number and variety of templates offered to customers without requiring a laborious individual one-template-at-a-time design method

SUMMARY

The present invention is directed to satisfying the need for systems and methods that provide automated generation of electronic product designs.

In accordance with the invention, a number of images and layouts are retained and, in response to user selection inputs, electronic product designs reflecting combinations of images and layouts associated with the user inputs are displayed to the user. Standard image and layout image container sizes are employed.

It is an advantage of the invention that assembling a design from separate images and layouts allows a greater number and variety of designs to be economically offered. It is another advantage of the invention that standard image and image container sizes facilitate modularity and ease of image and layout combination.

These and other objects, features and advantages of the invention will be better understood with reference to the accompanying drawings, description and claims.

DETAILED DESCRIPTION

Figure 1:
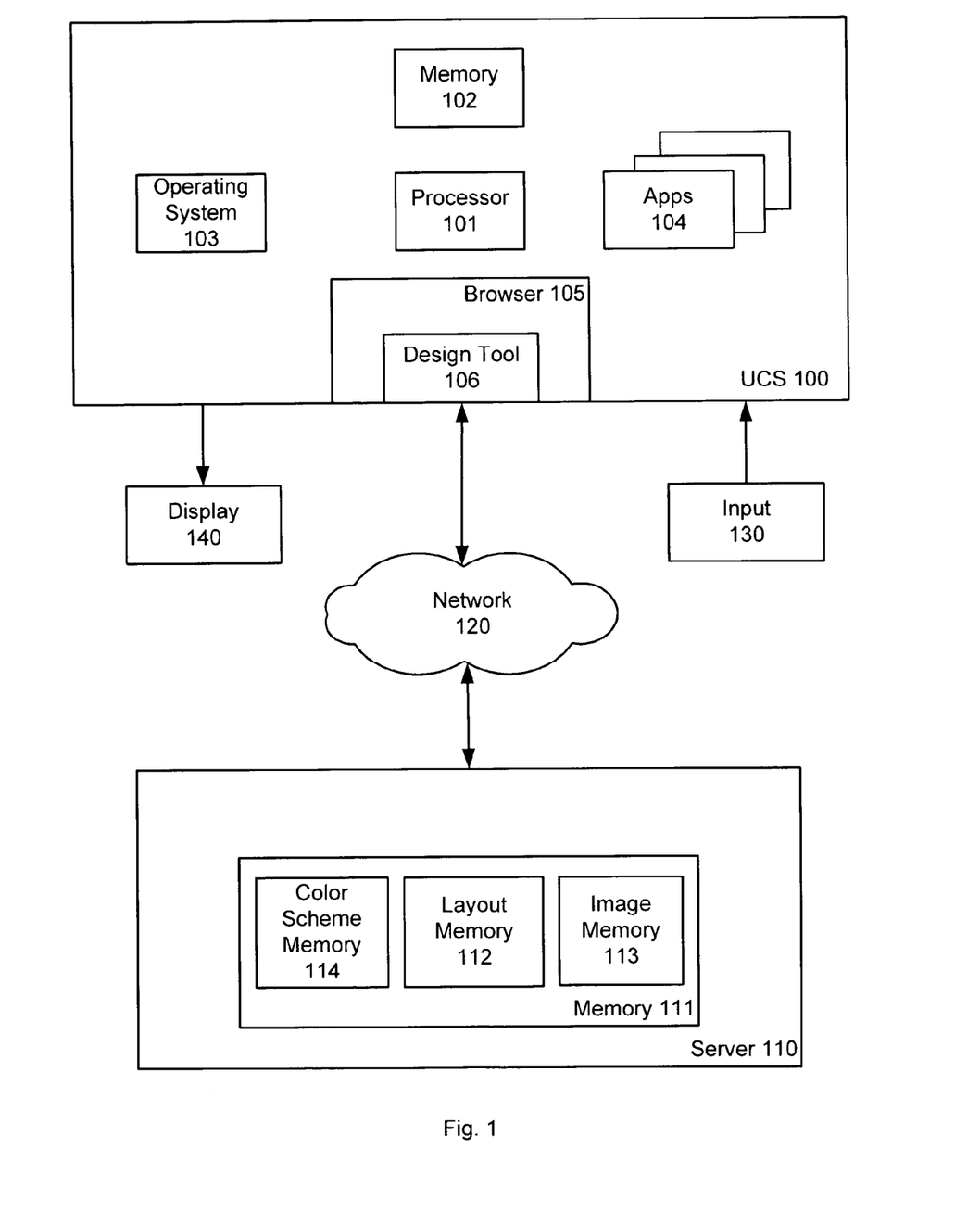
FIG. 1 is a block diagram of a computer system with which the invention may be employed.

Referring to FIG. 1, an exemplary user computer system UCS 100 includes processor 101 and memory 102. Memory 102 represents all UCS 100 components and subsystems that provide data storage, such as RAM, ROM, and hard drives. In addition to providing permanent storage for all programs installed on UCS 100, memory 102 also provides temporary storage required by the operating system and the applications while they are executing. In a preferred embodiment, UCS 100 is a typically equipped personal computer, but UCS 100 could also be a portable computer, a tablet computer or other device. The user views images from UCS 100 on display 140, such as a CRT or LCD screen, and provides inputs to UCS 100 via input 130, such as a keyboard and a mouse.

When UCS 100 is operating, an instance of the USC 100 operating system will be running, represented in FIG. 1 by Operating System 103. In addition, the user may be running one or more application programs. In FIG. 1, UCS 100 is running Web browser 105, such as Internet Explorer from Microsoft Corporation. Other applications that may be running in USC 100, such as spreadsheet, e-mail, and presentation programs, are represented as applications 104. In the exemplary embodiment, design tool 106 is a product design program downloaded to UCS 100 via network 120 from remote server 110. Design tool 106 runs in browser 105 and allows the user to prepare a customized product design in electronic form. Alternatively, design tool 106 could have been obtained by the user from memory 102 or from another local source. When the customer is satisfied with the design of the product, the design can be uploaded to server 110 for storage and subsequent production of the desired quantity of the physical product on appropriate printing and post-print processing systems. As will be discussed in more detail below, the user creates a custom product design by adding the user's content to a template prepared by the service provider. Each template is conceptually a combination of one or more images and a layout to which is applied a color scheme.

While server 110 is shown in FIG. 1 as a single block, it will be understood that server 110 could be multiple servers configured to communicate and operate cooperatively. Memory 111 represents all components and subsystems that provide server data storage, such as RAM, ROM, and disk drives or arrays. Layout memory 112 represents the portion of memory 111 that contains the XML layout descriptions. Each layout specifies the size, position and other attributes of all product elements such as text containers, image containers, graphics, z-index values and so forth. For each different type of product, layouts are provided that combine different numbers of image containers in different sizes and arrangements. In the postcard example described below, a portion of the postcard layouts include a single image container while other portions include two, three and four image containers Image memory 113 represents the portion of memory 111 that contains the images and related image attributes, such as the image size, the default color scheme associated with the image, and the one or more keywords that have been associated with that image by the printing service provider. Color scheme memory 114 contains the set of color schemes developed by the service provider for use in generating templates. A color scheme is a set of complementary colors, usually from three to five, pre-selected by the service provider to be applied as a group in a template design. Instead of assigning a fixed color to each template element having a color attribute, each such element in the template will be associated with one of the component positions in whichever color scheme has been selected for use with the template.

Figure 2:
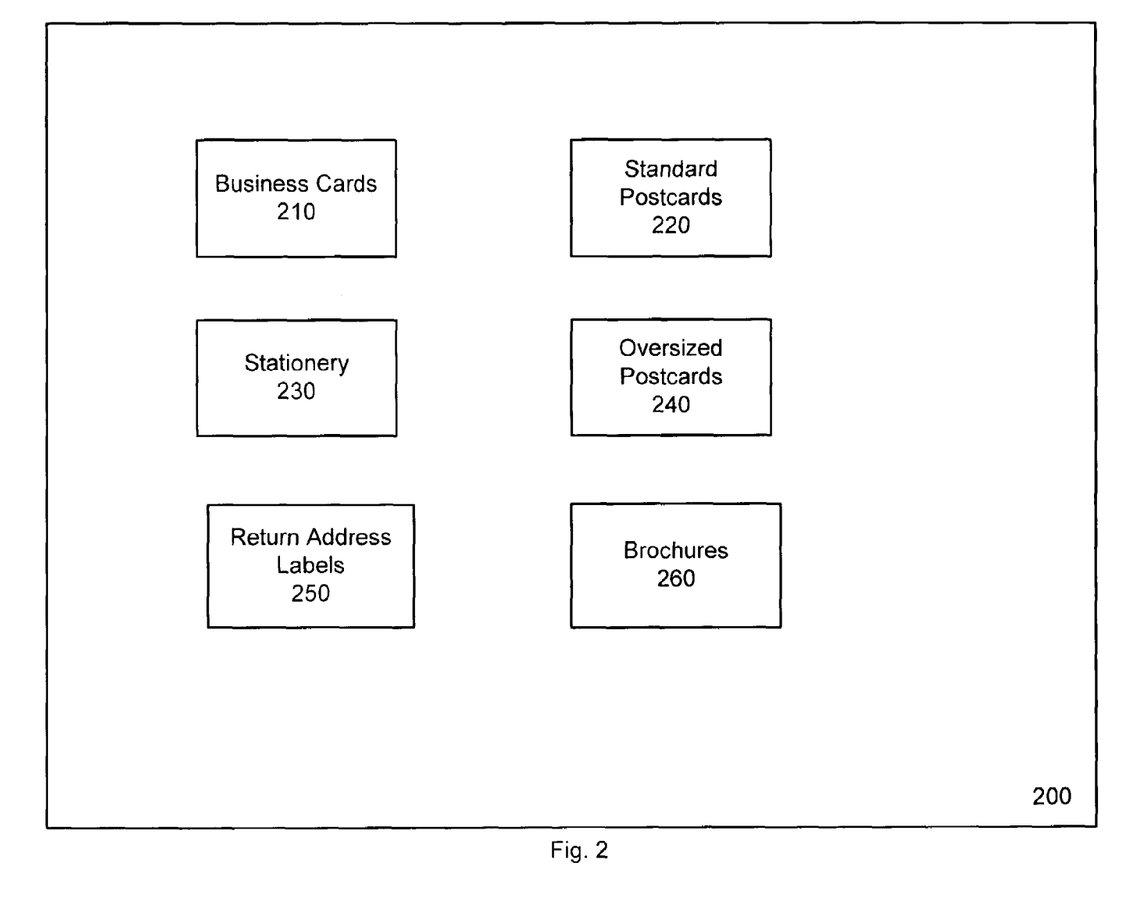
FIGS. 2-5 are schematic representations of displays available for viewing by a user during the creation of an electronic document.

In FIGS. 2-5, screen 200 represents the display being viewed by the user of UCS 100 on display 140. FIG. 2 is a representation of an introductory page provided by a Web-based electronic document design service provider. The page displays and promotes various types of products available from the service provider and offers active controls that allow the user of UCS 100 to select a desired type of product for a more detailed presentation of design options. By way of example, FIG. 2 shows promotional images for business cards 210, standard postcards 220, stationery 230, oversized postcards 240, return address labels 250, and brochures 260. Images or promotions for additional products, such as presentation folders, invitations, announcements, thank you cards, gift tags, and so forth could also be presented on the screen along with other information and links. It will be understood that the invention is not limited to documents that are intended for eventual printing. The invention is also applicable to the design of documents intended for use in electronic form, such as electronic business cards, online brochures, and templates for presentation graphics software programs. The invention could as well be readily adapted to a wide range of products that a user may wish to customize, such as items of clothing, product containers, promotional goods, and so forth.

Figure 3:
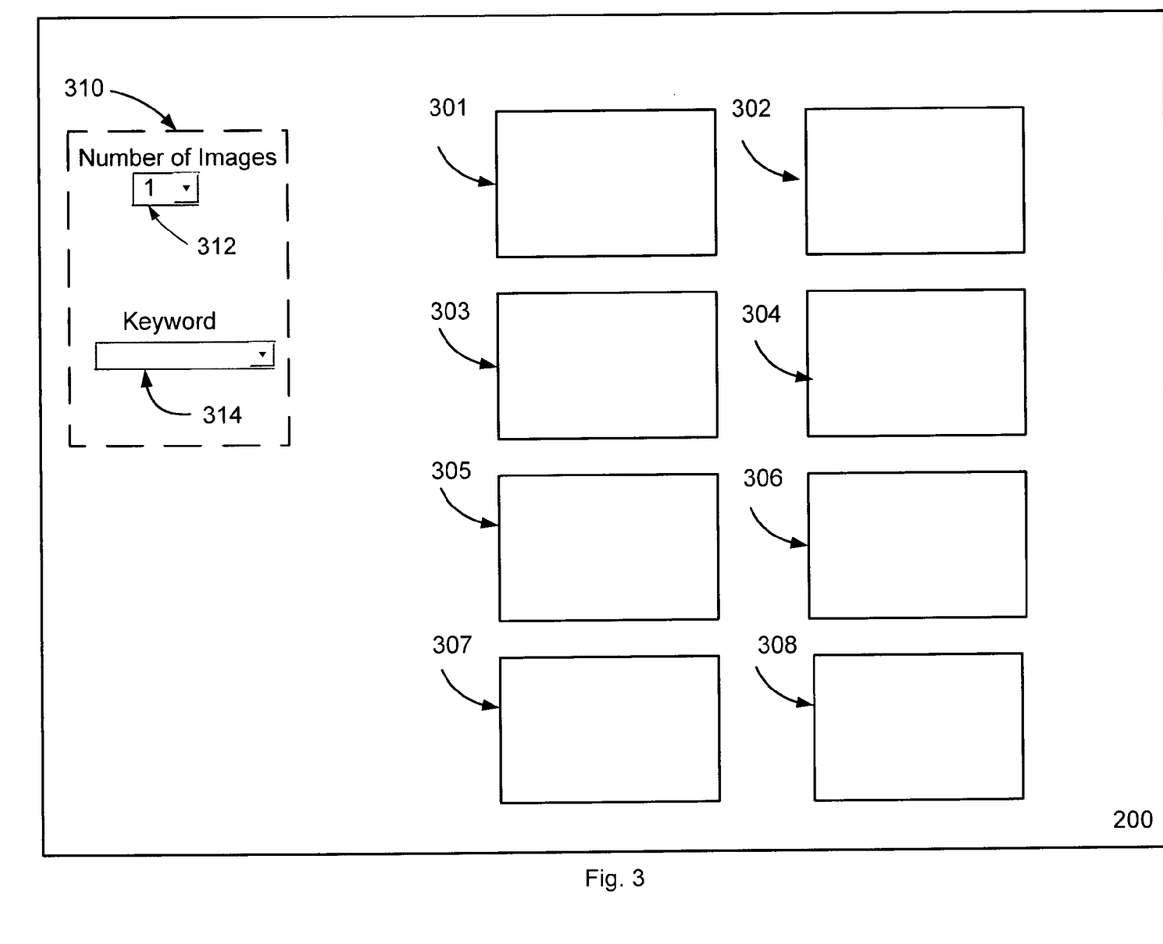

For the purpose of an illustrative example, it will be assumed that the user of USC 100 desires to create a custom standard postcard and, therefore, selects the standard postcard option, for example by clicking with the user's mouse cursor on the standard postcard 220 image. Referring to FIG. 3, in response to the user's selection, a page directed specifically to standard sized postcards is retrieved from server 110 and displayed to the user. On this page, the user is presented with eight thumbnail images 301-308 of sample postcard template designs. The service provider can choose to present more or fewer than eight images simultaneously, depending on available display space and the size of thumbnail images used.

At this early stage in the design process, the printing service provider is not aware of the particular purpose that the user has in mind for the user's postcard. To give the user an indication of the types of postcard designs that are possible, the service provider presents the user with the eight pre-designed default design examples 301-308 containing various combinations of images, graphics, colors and arrangements to give the user a range of visual appearances.

To allow the service provider to present the user with candidate product templates that are relevant to the user's intended purpose, customization area 310 is displayed to the user. Area 310 contains Number of Images tool 312, initially at a default setting of 1 image, and Keyword tool 314, initially empty. In the disclosed embodiment, tools 312 and 314 are both implemented as drop down menus. Other types of selection means could be readily employed. For example, tool 314 could be implemented as a search field where the user types in one or more terms to be compared with the keywords associated with stored images. Customization area 310 could also be implemented to contain additional filters for allowing the user to narrow the search according to certain image characteristics or content. For example, check boxes or another menu could be provided to allow the user to request templates with only photographic images or only illustrations.

Tool 312 allows the user to specify the number of images that the user desires to see in the product template. When in the selected mode (not shown), tool 312 provides a menu allowing the user to choose to see templates having one, two, three or four images. The number of image number choices offered by tool 312 may vary among the product types depending on the variety of layouts prepared by the service provider for each product type. For example, layouts for a relatively large product, such as an 8½ by 11 brochure could be designed by the service provider to contain a greater number of images than smaller products such as a business card or standard size postcard. As will be discussed further below, the user's inputs from tools 312 and 314 are used to present the user with a set of customized template designs.

Figure 4:
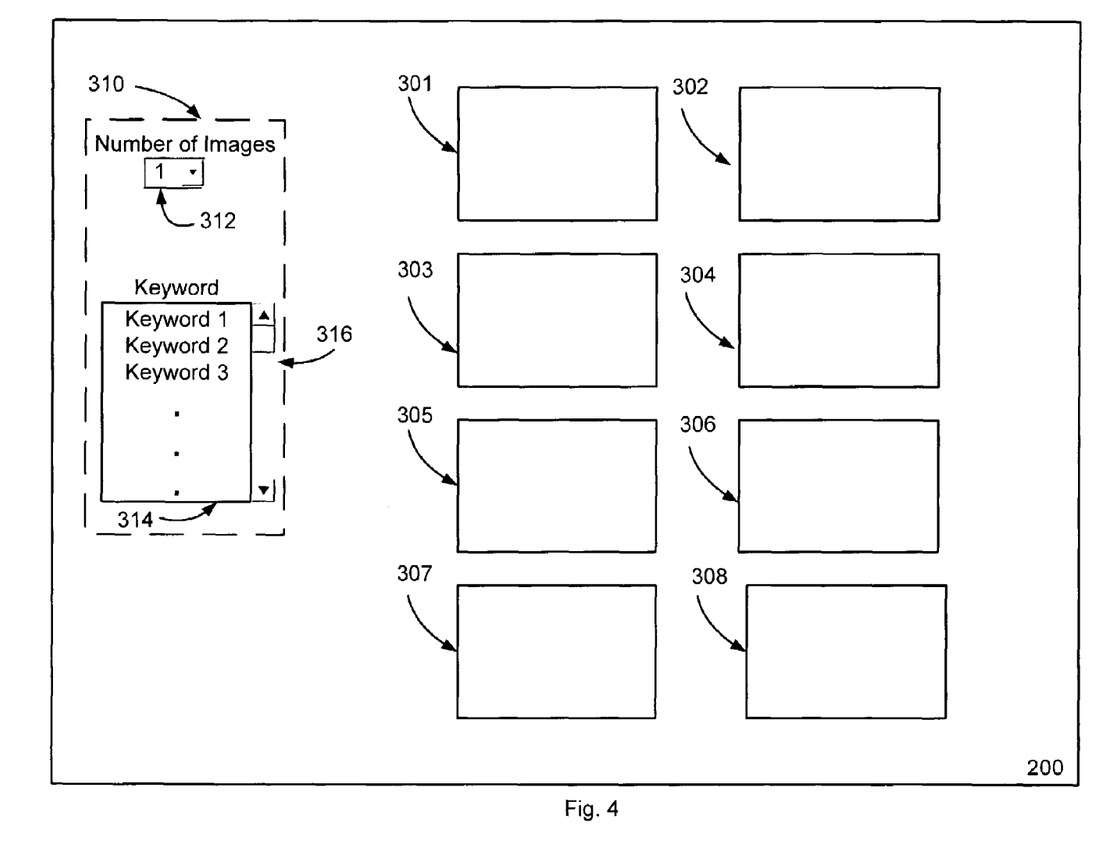

Referring to FIG. 4, the user has expanded menu 314 to display the available keyword selections. The use of keywords as a means of searching is well known. Scroll bar 316 allows the user to scroll through the various available keywords. Preferably each image is associated with a number of different types of keywords that provide various ways to locate the type of images that might be of interest to the user. For example, different keywords might relate to the main subject of the image, the action taking place, the setting, and the overall concept.

Figure 5:
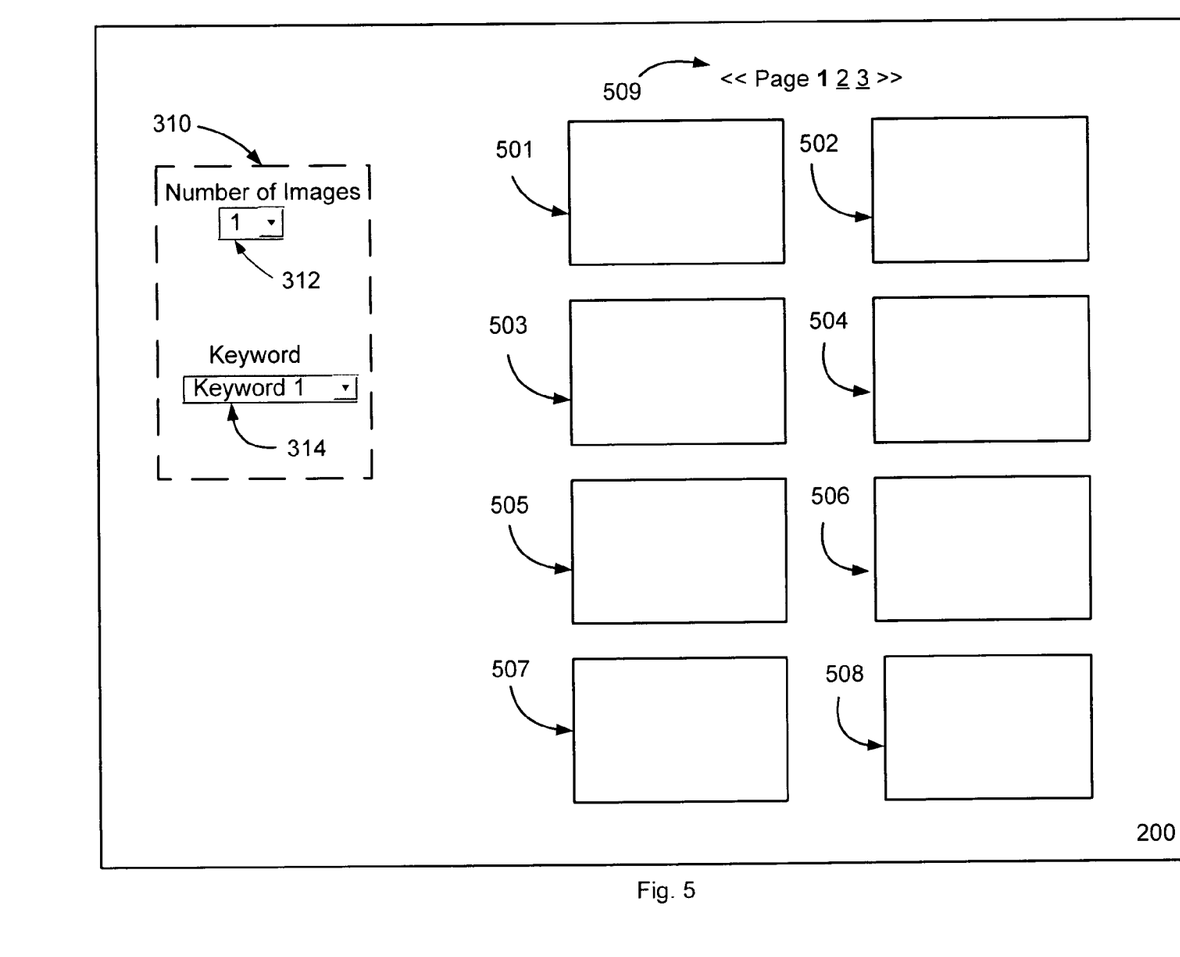

FIG. 5 depicts the example situation where the user has left the number of images in tool 312 unchanged at 1 and has selected Keyword 1. The eight initial product templates 301-308 have been replaced with eight new templates 501-508 generated by the system based on the combinations of images associated with Keyword 1 and available product templates having one image container. In the example illustrated in FIG. 5, more than eight templates were generated. This is indicated to the user by the presence of commonly used navigation tool 509, indicating that the user is currently seeing the first of three pages of templates.

Figure 6:
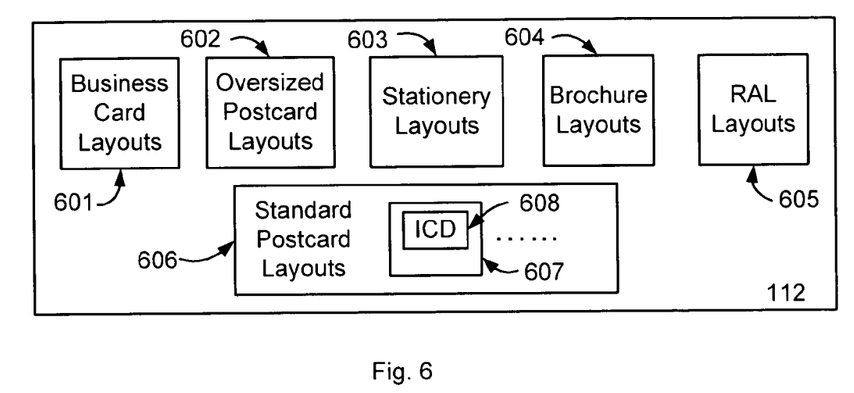
FIG. 6 is a representation of an organization of layout memory 112.

Referring now to FIG. 6, the contents of layout memory 112 will be discussed in more detail. Each of the various types of products, such as business cards, postcards, brochures and so forth, has a different combination of organizational requirements and physical dimensions. Layouts are, therefore, conceptually organized in layout memory 112 according to the type of product. For the set of products shown in FIG. 2, layout memory 112 will have business card layouts 601, oversized postcard layouts 602, stationery layouts 603, brochure layouts 604, return address label layouts 605, and standard postcard layouts 606, each of which contains a plurality of layouts for the associated type of product. For example, standard postcard layouts 606 contains a plurality of individual XML layout descriptions 607. Within each individual layout description is information defining the number of image containers in that layout, the size and location of each of image container, the z-indices of the containers, and the image container that contains the dominant image. This set of information in layout 607 is collectively represented in FIG. 6 as image control definition (ICD) 608.

The present invention constructs templates from a combination of separate components and attributes. Templates are separated into layouts, images available for placement in the layouts and template color schemes. This approach allows candidate templates to be assembled dynamically using images that are associated with the keyword entered by the user and, therefore, are likely to be relevant to the user's interests.

In addition to images, many templates will have various additional elements, such as lines, shapes, and graphic elements. Each of these elements will typically have one or more associated colors. If fixed colors are assigned to these non-image elements, or if colors are assigned randomly, there is a likelihood that some images will have colors that are not visually compatible with adjacent colors, creating an unappealing template. Assigning colors to template components is, therefore, advantageously handled by way of a separately controlled template color scheme. Techniques for defining and using color schemes are well known in the art.

A color scheme indicator is assigned to each image group. This indicator references a color scheme that contains colors selected by the service provider to be pleasing if presented adjacent to the images in the image group. One of the image containers in each layout will be identified as the container for the dominant image in the layout. The color scheme that is associated with the image placed in the dominant image container will control the color scheme used for graphics and other template components having color attributes.

To facilitate image and layout modularity and combinability, all layouts are designed with standard pre-defined image container sizes and all images are made available in at least some of the same standard sizes. The number of different standard image containers used and the exact size of each container is a discretionary choice of the service provider.

Figure 7A:
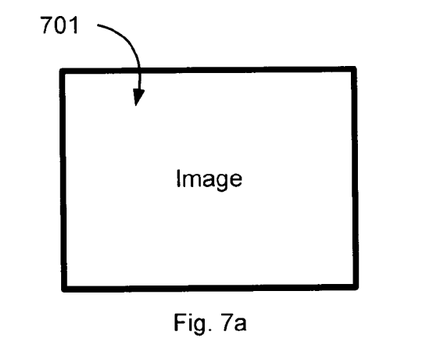
FIGS. 7a-7d depict various layouts.
Figure 7B:
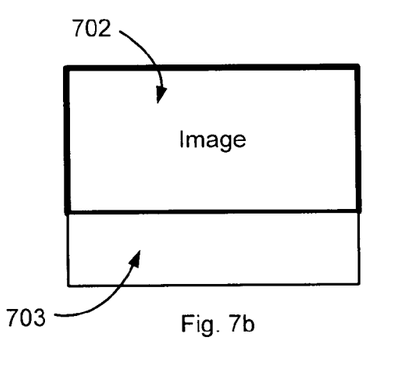

FIGS. 7a-7d depict a few of the many possible standard postcard layouts. FIGS. 7a and 7b depict two possible layouts for postcards using a single image. In FIG. 7a, a single image 701 occupies the entire area of the card. In FIG. 7b, image 702 is positioned across the top portion of the card. Area 703 is a non-image area, such as a field of solid color or visual effect. Layouts vary both by the size and shape of the image containers and by the location of the image containers. For this reason, multiple layouts may use the same size image container, with each layout having the image container located in a different position.

Figure 7C:
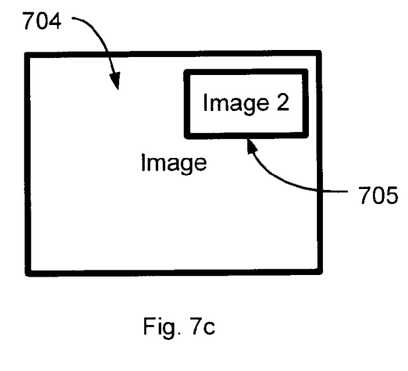
Figure 7D:
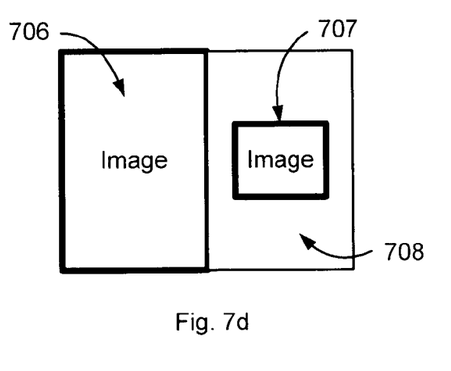

FIGS. 7c and 7d depict two possible layouts using two images. In FIG. 7c, image 704 occupies the entire area of the card with smaller image 705 placed above image 704. In FIG. 7d, image 706 is positioned on the left side and image 707 is positioned on the right side surrounded by non-image field 708. It will be understood that a great many other combinations of image sizes and positions could be developed and made available for users by the service provider. Similarly, layouts containing many combinations of image sizes and locations could be readily designed using three, four, or more images.

Figure 8:
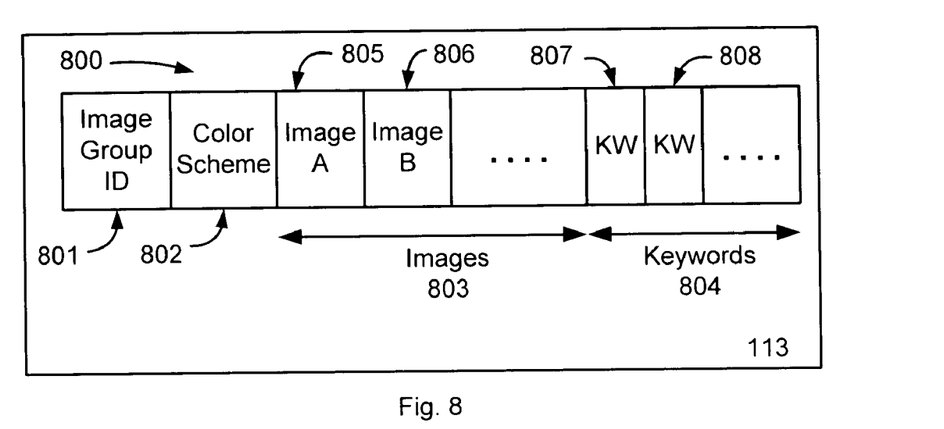
FIG. 8 is a representation of an organization of image memory 113.

Referring now to FIG. 8, the contents of image memory 113 will be discussed in more detail. Images are conceptually stored in image memory 113 as image groups. An image group is a set of different versions of a parent, or base, image. The different versions are created by the service provider by taking the base image and performing cropping operations, or a combination of zooming and cropping, to create a set of image versions designed to fit some or all of the standard image container sizes. Unlike layouts, which are typically designed especially for each particular type of product, image groups are made available for use with most, or all, different product types. This allows a user to present a consistent image by creating multiple different types of materials that all contain versions of the same base image. An image group will, therefore, typically contain images ranging in size from small images, suitable for use in smaller products such as return address labels, to larger images, suitable for use in larger products, such as stationery, brochures and presentation folders. Because the subject matter content of some base images may not lend itself to certain image container shapes, it is likely that all image groups will not have exactly the same set of component images sizes.

Referring again to FIG. 8, image memory 113 contains a large number of image groups. A representative image group is indicated in FIG. 8 as image group 800. Image group 800 has an image group identifier 801 and an associated color scheme indicator 802. Indicator 802 is assigned by the service provider based on the major color or colors in the image and identifies one of the color schemes in color scheme memory 114. Each image group also references a number of images 803. As mentioned above, each of the individual images in images 803 is a variation of a base image. Each image group in memory 113 further has one or more associated keywords 804 provided by the service provider to assist the user. Keywords 804 are members of the overall universe of keywords presented to the user by keyword tool 314.

When an image is placed in the dominant image container in the layout, the color scheme indicator 802 associated with that image group is used to identify the color scheme to be used to create the template. If the layout has only one image container, the image placed in that container will, by default, be the dominant image and the color scheme associated with that image will be used to control the colors of other template components, such as 703 in FIG. 7b or 708 in FIG. 7d. If the layout contains multiple image containers, one of the containers will be designated as the dominant container for that layout. Generally, the largest or most prominent container in the layout will be designated as dominant, but dominant status can be assigned to any image container in the layout.

Figure 9:
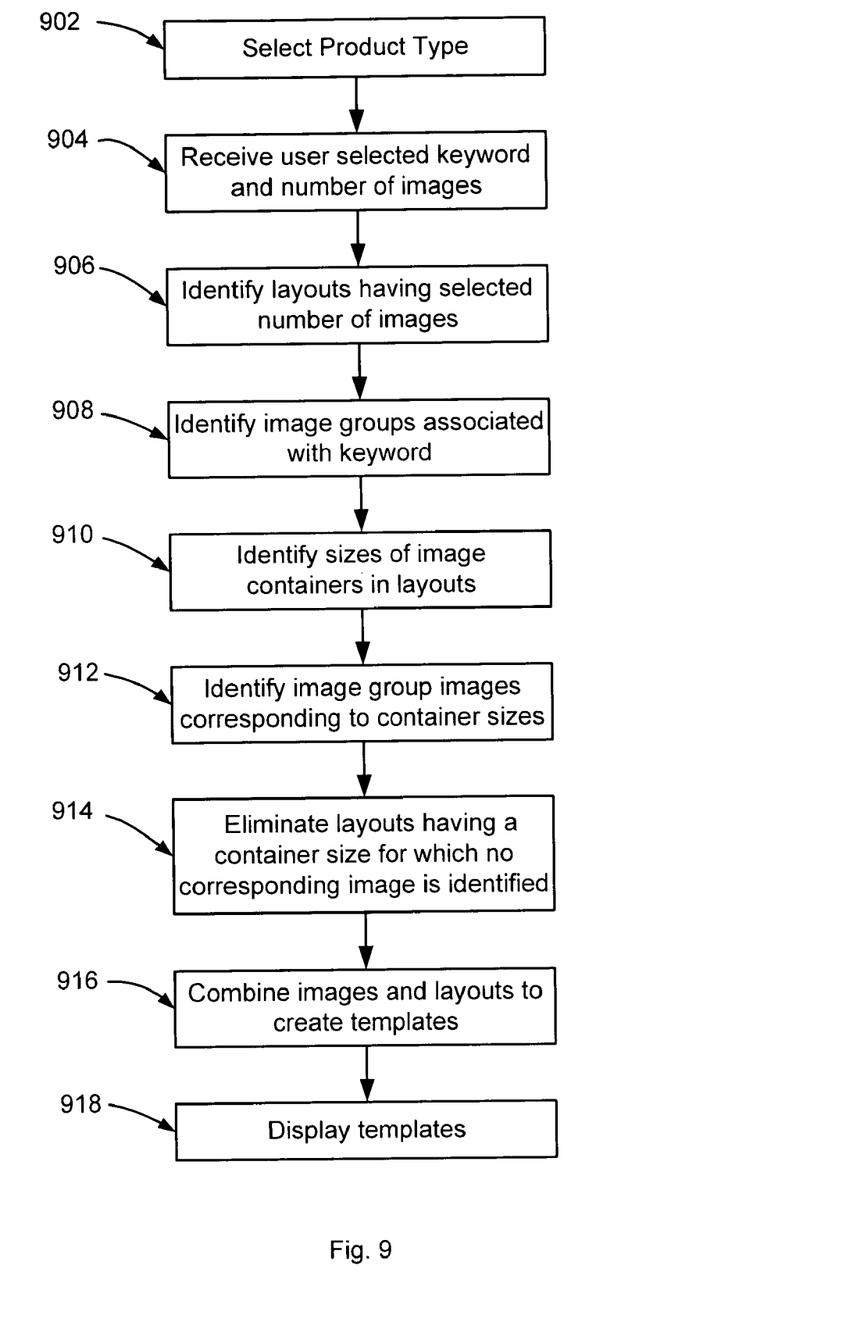
FIG. 9 is a flowchart of a template generation method.

Turning now to FIG. 9, the system operation will now be discussed. After the user has selected the basic type of product the user desires to create at step 902, the creation of the specific template designs to be presented to the user is initiated by the user's selections in customization area 310. At step 904, the user's act of selecting a keyword triggers the next steps in the template generation and displaying process. A set of layouts that have the appropriate number of image containers and are for the type of product being designed is identified at step 906. At step 908, the set of image groups associated with the selected keyword is identified.

As discussed above, each image container in each layout will have an associated standard size and each image group will have base image variations available in multiple different standard sizes. At step 910, the size of each image container in the layouts identified in step 906 is determined. At step 912, the images from the image groups identified at step 908 having sizes corresponding to the container sizes are identified. Because all images will not necessarily be available in all image container sizes, a layout may contain an image container size for which no image is available. At step 914, if one or more of the layouts identified at step 906 contain an image container size for which no image is available, that layout is eliminated from the template generation processing.

At step 916, the images identified at step 912 are combined with the layouts from step 914 to create templates. The number of templates that will result depends on the number of layouts, the number of images, and the requested number of images per layout. As an illustrative example, a user requests templates with a single image at step 902 and selects a keyword at step 904. The system identifies, for example, five single-image layouts at step 906 and four image groups associated with the keyword at step 908. At steps 910 and 912, the sizes of the image containers in each layout are compared to the available image size in each image group. If each image group has images that match the size of the image container in each layout, a total of twenty different templates will be created at step 916. If an image group does not have an image size corresponding to the size of the image container in a layout, a template for that particular combination will not be generated. For some base images, the service provider may choose to perform zooming and cropping operations to offer more than one version of the image at the same size. Therefore, the combination of N image groups and M layouts could yield more than N×M different templates if one or more of the image groups contain more than one image of the container size specified by a layout.

As the number of images per layout is increased, the possible number of different templates also increases. As an example, assume a user requests templates having two images and enters a keyword. For the purpose of the example, assume that three layouts are identified having two image containers, four image groups associated with the keyword are identified, and each identified image group has an image corresponding to each image container size in each layout. In other words, each of the three layouts has a first and second image container and each of the four image groups has a version of the image corresponding to the size of the first and second containers in each layout. In this example, the available images for each layout can be combined in sixteen different ways, if all possible variations are allowed, or in twelve ways, if template variations combining two images from the same image group are not allowed. The service provider would then have at least 36 templates to display to the user. As mentioned above, more or fewer templates could be generated depending on the number of available images in each image group that match the image container sizes.

Occasionally, an inadequate number of image groups may be identified. For example, a user may have requested templates with four images, but only three image groups associated with the keyword are identified. In this event, rather than disappointing the user by not supplying any templates, the service provider may choose to maintain a supply of default images or graphics which the service provider can use to substitute for one or more "missing" images. In the above example, templates would be generated using the three available images plus one of the default images. Alternatively, the service provider can, upon detecting that the number of images available is fewer than the number requested, use layouts for the number of images available. In other words, if four images were requested and only three image groups are available, the templates will be generated based on three image layouts rather than four image layouts.

At step 918, a portion of the templates generated at step 916 is selected and displayed to the user. Only a limited amount of display space is available for displaying the thumbnail template images. In the embodiment shown in FIG. 5, up to eight thumbnail images can be simultaneously displayed. If more than eight thumbnail template images were generated, they will be ordered into groups of eight for presentation to the user.

If the template generation process results in a small number of templates, all templates will be simultaneously displayed to the user for review. If the template generation process resulted in a large number of templates that cannot all reasonably be displayed simultaneously, templates are organized into multiple display pages, each display page showing a small grid of template thumbnail images, such as 501-508 in FIG. 5. As can be appreciated, the generation of the templates will typically result in images from the same image group appearing in multiple different layouts and with the same layout appearing with multiple different images. To present the thumbnails in a varied fashion that avoids displaying clusters of similar appearing templates, template organizational rules are applied when the thumbnails are being arranged into pages for display. To the extent possible, a display page of thumbnails will not place the same layout in adjacent positions on the display page and will not place layouts containing images from the same image group in adjacent locations.

The user can review the template thumbnails and select one for individual customization, for example by clicking on the desired thumbnail image with the user's mouse cursor. The system will then display the product template corresponding to the thumbnail image. At this point, the user may enter additional text or other content for incorporation into the displayed product design to create a personalized custom product. When the user is satisfied with the appearance of the product design, the user can save the design, for example by uploading the design to the service provider's server, and place an order for the production of a desired quantity of the product in printed form.

Figure 10:
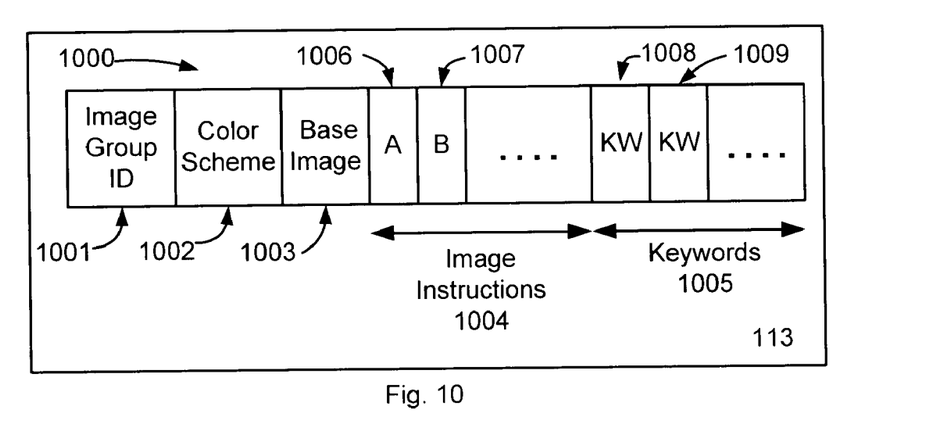
FIG. 10 is a representation of an alternate organization of image memory 113.

Referring to FIG. 10, an alternative embodiment of image memory 113 is depicted. Each image group has a group ID, color scheme and associated keywords, as described above in connection with FIG. 8. Instead of the system storing multiple base image variations, only base image 1003 and a plurality of image instructions 1004 are stored for each image group. Each of the image instructions 1004 contains the information necessary to create a base image variation.

Figure 11:
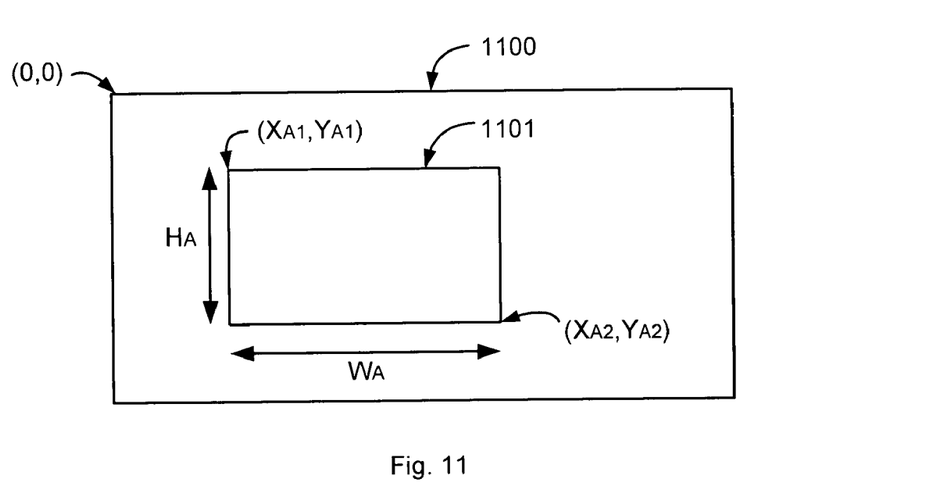
FIG. 11 is a representation of image generation according to the organization of image memory 113 of FIG. 10.

By way of example, referring to FIG. 11, image 1100 is a representation of the base image. The upper left corner is used as the reference origin and is assigned x and y coordinates (0,0). A variation 1101 of base image 1100 having a size corresponding to a layout container of size A can be specified by defining the location of the upper left corner of the image $(X_{A1}, Y_{A1})$ and the desired image height $H_A$ and width $W_A$. Alternatively, the size and location of an image variation can be determined based on the coordinates of a first corner, for example the upper left corner $(X_{A1}, Y_{A1})$, and a second diagonally opposite corner, such as the lower right corner $(X_{A2}, Y_{A2})$. If desired, a zoom parameter can also be stored for each image variation. This allows a portion of the base image to be defined and then enlarged in the amount specified by the zoom parameter to correspond to the size of a larger image container. This embodiment eliminates the need for storing the many individual image variations, but involves some additional processing at the time of template generation.

While the invention has been described in various exemplary embodiments, the described embodiments are to be considered as illustrative rather than restrictive. The scope of the invention, therefore, is as indicated in the following claims and all equivalent methods and systems.

What is claimed is:

1. A computer-implemented product design method comprising
   retaining a plurality of layouts having at least one image container of one of a plurality of container sizes,
   retaining a plurality of image groups having one or more associated selection criteria, each image group containing at least a plurality of images that are cropped versions of a base image, each cropped version being sized to correspond to one of the plurality of container sizes, and
   in response to the receipt of at least one selection criterion, identifying an image group associated with the received selection criterion, selecting an image from the identified image group having a size corresponding to the size of an image container in a selected layout, and placing the selected image in the image container of the layout.

2. The method of claim 1 wherein each retained image group is associated with a retained color scheme, wherein one image container in each layout is the dominant image container, and wherein the color scheme associated with the image in the dominant image container of a layout controls the color scheme used in the product design.

3. The method of claim 1 wherein the selected layout was selected based on the type of product being designed by the user.

4. The method of claim 1 wherein at least one received selection criterion is the desired number of images in the layout and wherein at least some of the plurality of retained layouts have a number of image containers corresponding to the desired number of images.

5. The method of claim 1 wherein at least one selection criterion associated with each image group is a keyword and wherein at least one received selection criterion is a keyword.

6. The method of claim 1 further comprising
   incorporating user-supplied content into the product design, and
   producing a quantity of a product in physical form from the product design.

7. A product design system comprising a server system having data storage means,
   a plurality of layouts stored on the server system, each layout having one or more image containers of one of a plurality of container sizes,
   a plurality of image groups stored on the server system and being associated with one or more selection criteria, each image group containing at least a plurality of images that are cropped versions of a base image, each cropped version being sized to correspond to one of the plurality of container sizes, and
   means responsive to at least one selection criteria for generating one or more product designs by identifying an image group associated with a received selection criterion, selecting an image from the identified image group having a size corresponding to the size of an image container in a selected template, and placing the selected image in the image container of the selected layout.

8. One or more data storage having computer executable instructions for execution on a server system, the server system operatively connected to at least one client system, the server system having a plurality of stored layouts, each layout including one or more image containers, each image container being one of a plurality of container sizes, and a plurality of stored image groups, each stored image group being associated with one or more selection criteria and containing at least a plurality of images that are cropped versions of a base image, each cropped version being sized to correspond to one of the plurality of container sizes, the computer executable instructions when executed on the server system performing the steps of:

downloading to and executing in a client system and to display one or more selection criteria tools to a user of the client system, and     receiving one or more selection criteria from the client system, and     sending to the client system one or more product designs, the one or more product designs being generated by selecting a layout, identifying an image group associated with a received selection criteria, selecting an image from the identified image group having a size corresponding to the size of an image container in the selected layout, and playing the selected image in the image container layout.

9. An automated design method comprising:

selecting a layout from one or more retained layouts, the selected layout having at least one image container,     selecting an image from a plurality of retained images, the selected image having associated therewith a plurality of cropping instructions, each of the plurality of instructions containing the information to create a cropped version of the selected image corresponding to the size of an image container, and     using the cropping instructions to create a cropped version of the selected image corresponding to the size of an image container in the selected layout.

10. The method of claim 9 further comprising preparing a product design by combining the selected layout with the image version created according to the cropping instructions.

11. The method of claim 10 further comprising providing the created product design for displaying to a user of the product design system.

12. The method of claim 11 further comprising incorporating user-supplied content into the product design, and producing a quantity of a product in physical form from the product design.

13. The method of claim 9 wherein the step of selecting an image is performed in response to one or more user inputs received from a user of the product design system.

14. The method of claim 13 wherein at least some of the retained images have one or more image selection criteria associated therewith and wherein the one or more user inputs comprise one or more image selection criteria.

15. The method of claim 14 wherein one or more image selection criteria are one or more keywords.

16. The method of claim 9 wherein the step of selecting a layout is performed in response to one or more inputs received from a user of the product design system.

17. The method of claim 16 wherein the one or more user inputs comprise information identifying the type of product being designed.

18. The method of claim 9 wherein the retained instructions include instructions to resize the selected image.

19. A computer-readable medium having computer-executable instructions for performing the steps recited in claim 9.

20. The method of claim 9 wherein each retained image is associated with a retained color scheme, wherein one image container in each layout is the dominant image container, and wherein the color scheme associated with the image in the dominant image container of a layout controls the color scheme used in the product design.

21. The method of claim 9 wherein the retained instructions include the height and width of the version of the selected image and the location of a point in the selected image from which the height and width are measured.

22. The method of claim 9 wherein the retained instructions for generating a version of a selected image include the location of at least two points in the selected image from which the height, width and position of the version can be determined.

23. A computer-readable medium having computer executable instructions for performing the steps recited in claim 1.

24. A product design system comprising a sewer system having data storage means, a plurality of layouts stored on the server system, each layout having one or more image containers of one of a plurality of container sizes,     a plurality of images stored on the server system and being associated with one or more selection criteria, each image having associated therewith a plurality of cropping instructions, each of the plurality of instructions containing the information to create a cropped version of the associated stored image, each cropped version being sized to correspond to one of the plurality of container sizes, and     means responsive to at least one selection criteria for generating one or more product designs by identifying a stored image associated with a received selection criterion, using cropping instructions associated with the identified image to create a cropped version of the identified image corresponding to the size of an image container in a selected template, and placing the cropped version of the identified image in the image container of the selected layout.

25. One or more data storage having computer executable instructions for execution on a server system the server system operatively connected to at least one client system, the server system having a plurality of stored layouts, each layout including one or more image containers, each image container being one of a plurality of container sizes, and a plurality of stored images, each stored image being associated with one or more selection criteria and having associated therewith a plurality of cropping instructions, each of the plurality of cropping instructions containing the information to create a cropped version of the associated stored image, each cropped version being sized to correspond to one of the plurality of container sizes, the computer executable instructions when executed on the server system performing the steps of:

downloading to and executing in a client system and to display one or more selection criteria tools to a user of the client system, and     receiving one or more selection criteria from the client system, and     sending to the client system one or more product designs, the one or more product designs being generated by selecting a layout, identifying an image associated with a received selection criteria, using cropping instructions associated with the identified image to create a cropped version of the identified image having a size corresponding to the size of an image container in the selected layout, and placing the selected image in the image container of the layout.

\* \* \* \* \*